United States Patent [19]
Dubois et al.

[11] Patent Number: 5,811,500
[45] Date of Patent: Sep. 22, 1998

[54] PROCESS FOR THE CONTROLLED RADICAL (CO) POLYMERIZATION OF (METH) ACRYLIC VINYL VINYLIDENE AND DIENE MONOMERS IN THE PRESENCE OF AN RH CO OR IR

[75] Inventors: Philippe Dubois, Ciplet; Georges Moineau, Angleur; Philippe Teyssie, Neuville En Condroz; Robert Jerome, Tilff, all of Belgium; Thierry Senninger, Hayange, France

[73] Assignee: Elf Atochem S.A., Puteaux, France

[21] Appl. No.: 884,219

[22] Filed: Jun. 27, 1997

[30] Foreign Application Priority Data

Nov. 7, 1996 [FR] France ................... 96 13571

[51] Int. Cl.$^6$ ....................................... C08F 4/06
[52] U.S. Cl. .................... 526/145; 526/135; 526/146; 526/147; 526/172
[58] Field of Search ................. 526/145, 135, 526/146, 147, 172

[56] References Cited

U.S. PATENT DOCUMENTS 4,145,486  3/1979  Haag et al. ................. 521/31
5,708,102  1/1998  Fryd et al. .................. 526/172

FOREIGN PATENT DOCUMENTS 0 072 066  2/1983  European Pat. Off. .
0 265 091  4/1988  European Pat. Off. .

OTHER PUBLICATIONS

Chemical Abstracts, vol. 85, No. 14, Abstracts No. 94941, "Polymerization and Copolymerization of Vinylic or Diene Compounds", p. 20, c. 1, 4 Oct. 1976, Columbus, OH.

"New Initiator Systems for Radical Polymerization of Vinyl Monomers",*Polymer Letters*, vol. 5, pp. 697–701, 1967.

*Primary Examiner*—Joseph L. Schofer
*Assistant Examiner*—Wu C. Cheng
*Attorney, Agent, or Firm*—Millen, White, Zelano, & Branigan, P.C.

[57] ABSTRACT

This process is characterized in that at least one of the said monomers is polymerized or copolymerized in bulk, solution, emulsion or suspension, at a temperature which may be as low as 0° C., in the presence of an initiator system comprising at least one non-peroxy radical-generator compound and at least one catalyst consisting of a metal complex represented by formula $Ma_a(L)_n$ in which M represents Rh, Co or Ir; A represents, a halogen or a pseudohalogen; the groups L, which may be identical or different, each represent a ligand which may be a chiral ligand, which is chosen from cyclooctadiene, PRR'R", P(OR) (OR') (OR"), NRR'R", ORR', SRR', SeRR', AsRR'R", SbRR'R", each radical R, R' and R" independently representing an optionally substituted $C_1$–$C_{14}$ alkyl group or an optionally substituted aromatic group, it being possible for at least two of these ligands to be joined together by one or more divalent radicals; a is an integer such that $1 \leq a \leq 3$; n is an integer such that $1 \leq n \leq 5$, and in the absence of activator.

21 Claims, No Drawings

PROCESS FOR THE CONTROLLED RADICAL (CO) POLYMERIZATION OF (METH) ACRYLIC VINYL VINYLIDENE AND DIENE MONOMERS IN THE PRESENCE OF AN RH CO OR IR

CROSS-REFERENCE TO RELATED APPLICATIONS

This application is related to commonly assigned concurrently filed applications entitled: Process for the Controlled Radical (Co)Polymerization of (Meth)Acrylic and Vinyl Monomers in the Presence of an Fe, Ru or Os Complex and (Co)Polymers Obtained (Attorney Docket No. CHAIL 21), based on French Application No. 96/10634 filed Aug. 30, 1996, by Thierry SENNINGER et al.; Process for the Controlled Radical Polymerization or Copolymerization of (Meth)Acrylic and Vinyl Monomers, and (Co)Polymers Obtained (Attorney Docket No. CHAIL 22), based on French Application No. 96/10125 filed Aug. 12, 1996, by Thierry SENNINGER et al.; and Process for the Controlled Radical Polymerization or Copolymerization of (Meth) Acrylic, Vinyl, Vinylidene and Diene Monomers, and (Co) Polymers Obtained (Attorney Docket No. CHAIL 23), based on French Application No. 96/16049 filed Dec. 26, 1996, by Thierry SENNINGER et al.

BACKGROUND OF THE INVENTION

The present invention relates to a process for the controlled radical polymerization or copolymerization of (meth) acrylic and/or vinyl and/or vinylidene (for example vinylaromatic) and/or diene monomers.

Radical polymerization constitutes one of the polymerization processes which is most frequently exploited industrially on account of the variety of polymerizable monomers (70% of commercial monomers), the ease of implementation and the ease of the synthetic processes used (emulsion, suspension, bulk or solution polymerization). However, it is difficult in standard radical polymerization to control the polymer chain size and the molecular mass distribution. The polymers thus prepared contain chains of very high and very low masses (wide polydispersity), which leads to a mixture of homopolymers.

The techniques of ionic or coordinative polymerization themselves allow correct control of the process, but the reaction conditions which these polymerization methods require cannot always be achieved at the industrial scale (purity of the monomers and reactants, inert atmosphere). Furthermore, many monomers cannot be polymerized by these techniques.

Although a few examples of controlled radical polymerization of (meth)acrylic or vinylaromatic monomers exist at the present time, the systems concerned require either high polymerization temperatures, as with CuX/2,2'-bipyridine systems (X=halogen such as Cl), the initiator being an alkyl halide, or with $CuX_2$, the initiator being azobisisobutyronitrile, or the presence of an activator of Lewis acid type, which is water-sensitive ($RuCl_2(PPh_3)_3$ complex). However, when the temperature is high, thermal auto-initiation takes place, which leads in particular to a decrease in the control of the polymerization.

In addition, for emulsion or suspension polymerization, it is known that most of the processes are carried out in aqueous medium and, thus, it is necessary to work at temperatures below 100° C. in order to ensure that these emulsions or suspensions are stable.

Although, admittedly, the temperature may be lowered, the presence of Lewis acids is then necessary and this implies working in anhydrous medium.

It is also necessary for the catalyst not to be degraded by water under the normal polymerization conditions.

The concept used for controlling the polymerization involves redox reactions for transferring atoms or groups of atoms reversibly. The metal complex oscillates permanently between two oxidation states during the polymerization. This concept has been widely exploited in organic chemistry and was discovered by Kharasch in 1947 with the addition of polyhalomethanes to olefins. The mechanism may also involve cycles of oxidative additions and reductive eliminations. In both cases, it is a process which is repeated constantly except in the case of gradual destruction of the catalyst by side reactions.

Noriyuki Kameda has studied the radical polymerization of vinyl monomers extensively, using initiator systems comprising metals from group 9 of the Periodic Table, and in particular rhodium and iridium.

Kameda (*Nippon Kagaku Kaishi* 1983, 8, 1196., *Kobunshi Ronbunshu* 1984, 41, 679., *Kobunshi Ronbunshu* 1985, 42, 485.) studied the rhodium complex $RhH_2(Ph_2NNNPh)(PPh_3)_2$ (RN=36059-83-3), which allows methyl methacrylate (MAM), vinyl acetate or styrene to be polymerized in various solvents (DMSO, benzene or dimethylformamide). In the case of the polymerization of MAM, a linear increase of the average mass with the conversion is observed, which would be a sign of a live polymerization.

More recently, Kameda (*Nippon Kagaku Kaishi* 1989, 4, 736. or *Kobunshi Ronbushu* 1979, 36, 347.) has studied the polymerization of MAM initiated by $RhH(CO)(PPh_3)_3/$ polyamine/$CCl_4$ or $RhH(CO)(PPh_3)_3/CCl_4$ systems. No live nature is noted for this type of system.

Kameda (*Nippon Kagaku Kaishi* 1977, 8, 1216., *Nippon Kagaku Kaishi* 1976, 4, 682., *Nippon Kagaku Kaishi* 1979, 1, 122.) has also studied the polymerization of MAM initiated by the mixture of an iridium complex, such as $IrCl(CO)(PPh_3)_2$ (RN=14871-47-1), $IrCl(CO)(PPh_3)_3$ (RN=41114-18-5) or $Ir(H)(CO)(PPh_3)_3$ (RN=17250725-8) and of an alkyl halide such as $CBr_4$, $CCl_4$ or $CHBr_3$. Although it has been demonstrated that the initiation of the polymerization was radical-mediated, no live nature was noted for this type of system.

Lastly, Kameda has polymerized vinyl monomers with initiation by radical initiators such as benzoyl peroxide $Bz_2O_2$ (RN=94-36-0) or tert-butyl hydroperoxide tBuOOH (RN=75-91-2), combined with a complex of group 9 such as, for example, $RhCl(CO)(PPh_3)_2$ or $IrCl(CO)(PPh_3)_2$. Again, no live nature is mentioned for this type of combination.

SUMMARY OF THE INVENTION

The aim of the present invention consequently consists in overcoming the abovementioned drawbacks and in achieving radical polymerizations which allow control that is identical to ionic and coordinative polymerizations under industrially acceptable synthetic conditions, and which consequently make it possible to synthesize fully defined, pure block or random homopolymers and copolymers of predetermined length, which it has not been able to synthesize hitherto.

In general, the aim of the invention is to present a process for the radical polymerization or copolymerization of (meth) acrylic and/or vinyl and/or diene monomers which makes it possible to control the growth of the polymer chains, the polymerization process being carried out in bulk, solution, emulsion or suspension until all of the above monomer or monomers are consumed.

For this, it is necessary to prevent, or at the very least to limit, recombination and dismutation termination reactions and to promote rapid initiation of the polymerization or copolymerization.

Accordingly, one of the essential aims of the invention is to propose catalysts and initiators which make it possible, without requiring an appreciable modification in the standard technology, to obtain, under industrially and economically viable conditions, polymers and copolymers which meet the commercial requirements of regioselectivity, stereoselectivity and control of the molecular masses and their distributions.

To this end, a process is provided, according to the present invention, for the controlled radical polymerization or copolymerization of (meth)acrylic and/or vinyl and/or diene monomers, characterized in that at least one of the said monomers is polymerized or copolymerized in bulk, solution, emulsion or suspension, at a temperature which may be as low as 0° C., in the presence of an initiator system comprising:

at least one non-peroxy radical-generator compound; and at least one catalyst consisting essentially of a metal complex represented by formula (I) below:

$$MA_a(L)_n \quad (I)$$

in which:

M represents Rh, Co or Ir;

A represents a halogen or a pseudohalogen;

the groups L, which may be identical or different, each represent a ligand which may be a chiral ligand, which is chosen from cyclooctadiene, PRR'R", P(OR)(OR')(OR"), NRR'R", ORR', SRR', SeRR", AsRR'R", SbRR'R", each radical R, R' and R" independently representing an optionally substituted $C_1$–$C_{14}$ alkyl group or an optionally substituted aromatic group, it being possible for at least two of these ligands to be joined together by one or more divalent radicals;

a is an integer such that $1 \leq a \leq 3$;

n is an integer such that $1 \leq n \leq 5$, and in the absence of activator.

M preferably represents Rh.

A represents a halogen chosen from Cl, Br, F and I or a pseudohalide chosen in particular from CN, NCS, $NO_2$, $NO_3$, $N_3$, $OCOCF_3$, $OCOCH_3$ and $BF_4$.

The divalent radicals which may connect certain ligands L may be, for example, an alkylene radical, such as methylene (—$CH_2$—), ethylene (—$CH_2CH_2$—), or trimethylene (—$CH_2CH_2CH_2$—) radicals, which may themselves be substituted, for example with a $C_1$–$C_{14}$ alkyl or aryl group.

In particular, the groups L may each represent a monophosphine PRR'R", R, R' and R" each independently representing a $C_1$–$C_{14}$ alkyl group which may be substituted with $SO_3^-$, COOH, alkoxy, alkyl-S-, or an aromatic group which may be substituted with at least one substituent chosen in particular from halogen, such as Cl, Br or F, alkyl, $CF_3$ alkoxy, $NO_2$ or $SO_3^-$, it being possible for at least two of these ligands to be connected to form a polyphosphine which may contain at least one hetero atom, such as N, P, S or O.

Examples of optionally substituted alkyl groups falling within the definition of R, R' and R", which may be mentioned are methyl, ethyl, n-propyl, n-butyl and $NCCH_2CH_2$—, and examples of optionally substituted aromatic groups which may be mentioned are phenyl, 1-naphthyl, p-$FC_6H_4$, m-$ClC_6H_4$, o-$CH_3OC_6H_4$, p-$CF_3C_6H_4$, 2,4,6-trimethoxyphenyl, $C_6F_5$, o-$CH_3C_6H_4$, p-$CH_3C_6H_4$, m-$CH_3C_6H_4$.

Mention may also be made of monophosphines bearing groups intended to make them soluble, such as sodium triphenylphosphine monosulphonate (TPPMS) or sodium triphenylphosphine trisulphonate (TPPTS):

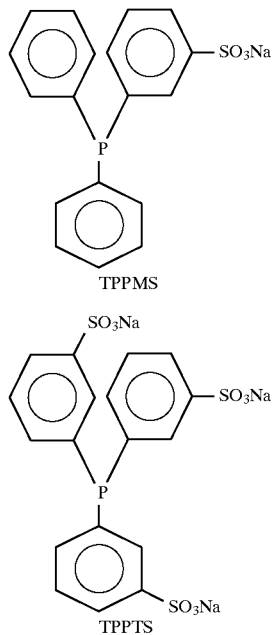

TPPMS

TPPTS and chiral monophosphines, such as (S)-(+)-neomenthyldiphenylphosphine ((S)-NMDPP) (CAS Number=43077-29-8).

Mention may also be made of O—SMe—$C_6H_4$—P—$Ph_2$, as well as O—SMe—$C_6H_4$—PPh—$C_6H_4$—O—SMe.

Polyphosphines which may be mentioned are the compounds of the following general formula:

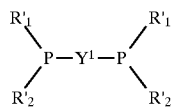

in which:

$R'_1$ and $R'_2$ each independently represent alkyl, substituted alkyl, alkyl bearing a —COOH or —$NH_2$ function, aryl or substituted aryl, such as $C_6H_5$;

$y^1$ represents:

alkylene; substituted alkylene;

arylene; substituted arylene binaphthyl;

1,2-cyclopentyl;

—$(CR'_3R'_4)_n$—Z—$(CR'_5R'_6)_m$-, with $R'_3$ to $R'_6$ each independently representing H or alkyl; n and m each representing an integer from 0 to 3; and

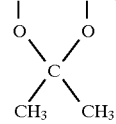

Z = —C——C—, pyridyl or phenylene;

-$[(CR'_7R'_8)_p$-T$]_q$-$(CR'_9R'_{10})_r$-, with $R'_7$ to $R'_{10}$ each independently representing H or alkyl; p, q and r representing an integer from 1 to 5, and T=—O—; —S—; —NR'$_{11}$-; —PR'$_{12}$ (R'$_{11}$, R'$_{12}$=C$_1$–C$_{14}$ alkyl, aryl);

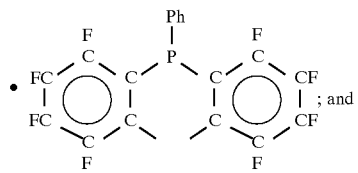; and

—C$_6$H$_5$—CH=CH—C$_6$H$_5$-.

Mention may be made in particular of:

diphosphines such as, for example:

Me$_2$PCH$_2$CH$_2$PMe$_2$

Ph$_2$PCH$_2$PPh$_2$

Ph$_2$PCH$_2$CH$_2$PPh$_2$

Ph$_2$P(CH$_2$)$_n$PPh$_2$, n=3 to 14

(C$_6$F$_5$)$_2$PCH$_2$CH$_2$P (C$_6$F$_5$)$_2$ chiral diphosphines capable of providing stereospecificity to the polymerization, such as:

(4R,5R)-(−)-O-isopropylidene-2,3-dihydroxy-1,4-bis (diphenylphosphino)butane ((R,R)-DIOP) (CAS Number=37002-48-5)

(4S,5S- (+)-O-isopropylidene-2,3-dihydroxy-1,4-bis (diphenylphosphino)butane ((S,S)-DIOP);

(R)-(+)-2,2'-bis(diphenylphosphino)-1,1'-binaphthyl ((R)-BINAP) (CAS Number=76189-55-4);

(S)-(−)-2,2'-bis(diphenylphosphino)-1,1'-binaphthyl ((S)-BINAP) (CAS Number 76189-56-5);

(2S,3S)-(−)-bis(diphenylphosphino)butane ((S,S)-CHIRAPHOS) (CAS Number=648976-28-2);

(2S,4S)-(−)-2,4-bis(diphenylphosphino)pentane ((S,S)-BDPP) (CAS Number=77876-39-2)

R-(+)-1,2-bis(diphenylphosphino)propane ((R)-PROPHOS) (CAS Number=67884-32-6)

diphosphines represented by the formulae:

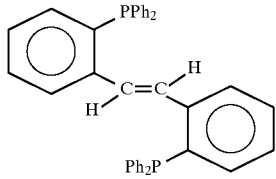

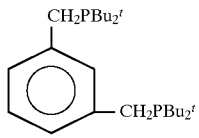

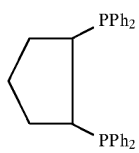

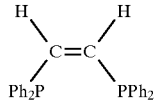

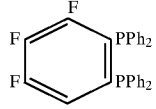

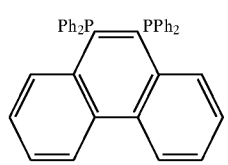

diphosphines containing hetero atoms, such as, for example:

Ph$_2$PCH$_2$CH$_2$OCH$_2$CH$_2$PPh$_2$;

Ph$_2$PCH$_2$CH$_2$OCH$_2$CH$_2$OCH$_2$CH$_2$PPh$_2$;

Ph(CH$_2$COOH) PCH$_2$CH$_2$P (CH$_2$COOH) Ph;

Ph$_2$P(CH$_2$)$_n$S(CH$_2$)$_m$S(CH$_2$)$_p$PPh$_2$; (n, m and p each independently representing 2 or 3);

diphosphines of the formula:

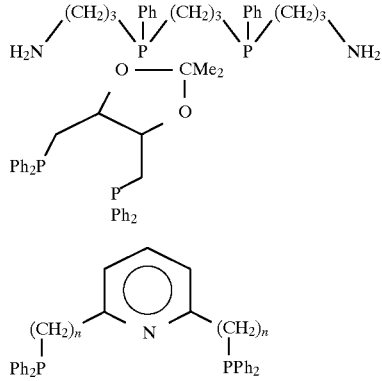

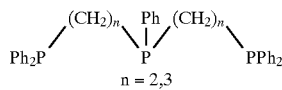

triphosphines, such as those of formulae:

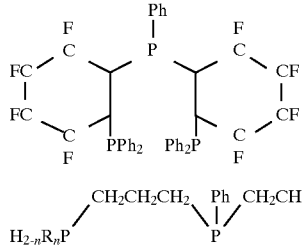

R = Me, Ph
n = 0, 1, 2 with PPh$_2$ possibly being replaced by PPhMe or PMe$_2$.

The ligands may also be chosen from the family of phosphites P(OR) (OR') (OR''), with, for example, R, R' and R'' chosen independently from C$_1$–C$_{14}$ alkyl groups, particularly n-butyl, isopropyl, ethyl, methyl, (CH$_3$)$_3$CCH$_2$-, and C$_6$H$_4$.

The complex of formula (I) may moreover bear a cationic charge which makes it more able to coordinate the monomers, especially polar monomers. This cationic charge may be provided by extraction of a halo ligand, for example using AgBPh$_4$, AgBF$_4$, TlBF$_4$ or TlBPh$_4$ or alternatively AgB(C$_6$F$_5$)$_4$ or AgCF$_3$SO$_3$.

The preferred complexes are those of the formula RhCl (PRR'R")$_3$, R, R' and R" being as defined above, and in particular the Wilkinson complex RhCl(PPh$_3$)$_3$ of CAS Number 14694 95-2 or its bromo equivalent RhBr(PPh$_3$)$_3$ (CAS=14973-89).

The complex of formula (I) may be introduced directly into the reaction medium, or it may be formed in situ in this medium from a metal salt of formula MA$_b$ or MA$_b$.xH$_2$O, M and A being as defined above, b being 2 or 3, and x being between 1 and 10, and ligands L as defined above.

The anhydrous metal salts MA$_b$, may be chosen from RhCl$_3$ (CAN=100 49-07-7), RhI$_3$ (CAN=15 492-38-3), CoCl$_2$ (CAN 7646-79-9), CoF$_2$ (CAN=10 026-17-2) and CoF$_3$ (CAN=100 26-18-3), and the hydrated metal salts MA$_b$.xH$_2$O, may be chosen from RhBr$_3$.2H$_2$O (CAN=15 608-29-4), RhCl$_3$.xH$_2$O (x being between 1 and 10) (CAN= 20 765-98-4) and CoCl$_2$.6H$_2$O (CAN=7791-13-1).

Since the catalyst does not act as a radical generator, it is thus essential to combine it with such a compound. The reaction between the radical generator and the metal species M described above gives rise to a controlled polymerization. A polymerization may thus be continued by adding a fresh dose of a monomer, which may be different from the first. If this monomer is different from the first, and if it is added after the first has been consumed (or up to a high conversion of above 80%, preferably 95%), a block copolymer will be obtained. If it is added at the same time as the first, the copolymerization will be random and a random copolymer will be obtained. For the preparation of block copolymers, it may be envisaged to use a mixture of two or more catalysts, the second dose of monomer being added in the presence of a different catalyst but still of the type as defined in the context of the present invention, this catalyst then needing to be more active than the one already present. This operation may be repeated in this way at each new sequence which it is desired to prepare.

According to the invention, radical-generator compounds that are particularly suitable are halo compounds activated by electron-donating and/or electron-withdrawing effects on the carbon atom in the position α to the halogen or halogens of the said compound, in particular those indicated below:

when the radical generator is monofunctional, it may be chosen from the following classes of compounds:

(a) derivatives of formula:

where:

Y=Cl, Br, I, F, H or —CR$^1$R$^2$OH, R$^1$ and R$^2$ each independently representing hydrogen or C$_1$–C$_{14}$ alkyl; and Z=Cl or Br, for example, carbon tetrachloride, chloroform, carbon tetrabromide, bromotrichloromethane and 2,2,2-tribromoethanol;

(b) derivatives of formula:

where R$^3$ represents a phenyl group; benzyl group; benzoyl group; alkoxycarbonyl group; group R$^4$CO with R$^4$ representing C$_1$–C$_{14}$ alkyl or aryl; alkyl group; mesityl group; trifluoromethyl group; or nitro group, such as, for example, α,α,α-trichlorotoluene, α,α,α,-trichloroacetophenone, ethyl trichloroacetate, 1,1,1-trichloroethane, 1,1,1-trichloro-2-phenylethane, tri-chloromethylmesitylene, 1,1,1-trichloro-2,2,2-tri-fluoroethane and trichloronitromethane;

(c) derivatives of formula:

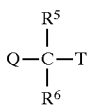

in which:

Q represents a chlorine or bromine atom or an acetate

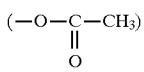

or trifluoroacetate

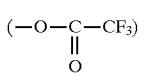

or triflate (O$_3$SCF$_3$) group;

R$^5$ represents a hydrogen atom, a C$_1$–C$_{14}$ alkyl group or an aromatic group of the benzene, anthracene or naphthalene type, for example, or a —CH$_2$OH group;

T represents a group

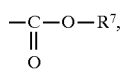

with R$^7$ each representing hydrogen or an alkyl or aromatic group; a CN group; a group

with R$^8$ representing C$_1$–C$_{14}$ alkyl, phenyl or isocyanate; a hydroxyl group; a nitro group; a substituted or unsubstituted amino group; a C$_1$–C$_{14}$ alkoxy group; a group R$^9$CO, with R$^9$ representing C$_1$–C$_{14}$ alkyl or aryl;

R$^6$ represents a group falling within the definitions of R$^5$ or of Q or a functional group such as hydroxyl, nitro, substituted or unsubstituted amino, C$_1$–C$_{14}$ alkoxy, acyl, carboxylic acid or ester;

such as, for example, 2-bromopropionic acid, 2-bromobutanoic acid, 2-bromohexanoic acid, ethyl 2-bromo-2-methylpropionate, bromoacetonitrile, 2-bromopropionitrile, 2-bromoisobutyrophenone and chloroacetyl isocyanate; 2-bromo-2-nitro-1,3-propanediol and 2-bromo-2-nitropropane;

(d) α-halo lactone or lactam compounds such as a-bromo-α-methyl-γ-butyrolactone or α-bromo-γ-valerolactone, halogenated lauryllactam or halogenated caprolactam;

(e) N-halosuccinimides, such as N-bromosuccinimide, and N-halophthalimides, such as N-bromophthalimide;

(f) alkylsulphonyl halides (chlorides and bromides), the alkyl residue being C$_1$–C$_{14}$ in particular, and arylenesulphonyl halides such as those of formula:

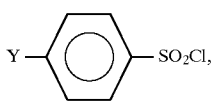

where Y=Me, Cl, OMe, NO$_2$;

(g) compounds of formula:

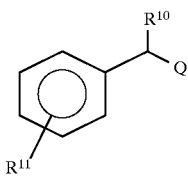

where:

R$^{10}$ represents a hydrogen atom, a C$_1$–C$_{14}$ alkyl group or a carboxylic acid, ester, nitrile or ketone group;

R$^{11}$ represents a hydrogen atom or a C$_1$–C$_{14}$ alkyl, hydroxyl, acyl, substituted or unsubstituted amine, nitro, C$_1$–C$_{14}$ alkoxy or sulphonate (SO$_3^-$Na$^+$or K$^+$) group; and Q has the meaning given above;

(h) compounds of formula:

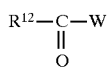

where:

R$^{12}$ represents C$_1$–C$_{14}$ alkyl or aryl; and

W represents a halogen, preferably Cl and Br, or a pseudohalogen such as N$_3$ or SCN;

(i) compounds of formula:

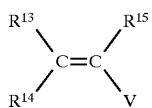

where:

R$^{13}$, R$^{14}$ and R$^{15}$ each independently represent C$_1$–C$_{14}$ alkyl or aryl; and V represents a halogen, preferably such as Cl or Br, or also an acetate, trifluoroacetate or triflate group;

and (j) aromatic halides of formula:

where:

Ar represents an aromatic group such as C$_6$H$_5$- which may be substituted in the meta, ortho or para position with an electron-withdrawing group, such as NO$_2$, NO$_3$ or SO$_3$, or an electron-donating group, such as an alkyl group or an —ONa group; and U represents a halogen, preferably such as Cl or Br.

It may also be envisaged to use difunctional radical generators and generators of higher functionality; the difunctional radical generators may consist of two monofunctional radical generators A$^1$ and A$^2$ derived from the abovementioned classes (c) to (j), connected by a chain of methylene units or by a benzene ring or by a combination of the two, as represented by the formulae:

with s being an integer from 1 to 14,

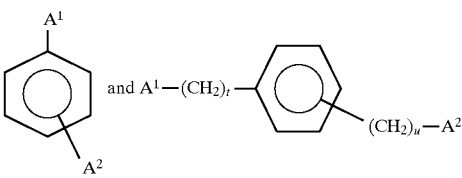

with t and u each independently representing an integer from 1 to 14.

In the case where A$^1$ and A$^2$ are derived from the class (c), the difunctional radical generators may be represented by the formula:

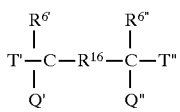

in which:

T' and T" each independently represent a group falling within the definition of T;

Q' and Q" each independently represent a group falling within the definition of Q;

R$^{6'}$ and R$^{6''}$ each independently represent a group falling within the definition of R$^6$; and R$^{16}$ represents a group —(CH$_2$)$_s$- ,

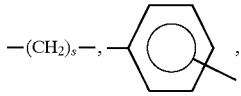

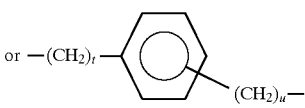

or as defined above.

Mention may be made, for example, of the difunctional initiators of formulae:

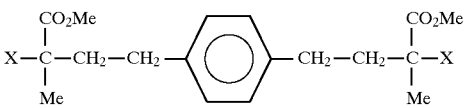

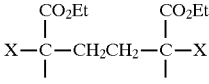

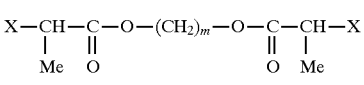

with X=halogen, such as Br and Cl; and m=integer from 1 to 10.

The use of a difunctional initiator allows the preparation of triblock copolymers of A(b)B(b)A type, by firstly synthesizing the central difunctional block, which serves to initiate the polymerization of the monomer A.

The multifunctional radical-generator compounds may consist of at least three monofunctional radical-generator groups $A^1$, $A^2$ and $A^3$ derived from the abovementioned classes (c) to (j) connected together by a benzene ring, such as, for example, those corresponding to the formula:

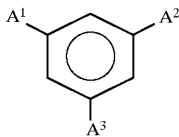

Other difunctional radical-generator compounds are tri- or tetrahalomethanes and trichloromethyl derivatives of the abovementioned classes (a) and (b), it also being possible for these same tri- and tetrahalomethanes to serve as multifunctional radical-generator compounds.

Difunctional radical-generator compounds other than those represented above may also be used, in particular those of the acetic anhydride family such as chloroacetic anhydride and chlorodifluoroacetic anhydride, as well as radical generators for standard radical polymerization, such as azo compounds, a representative example of the latter being especially 2,2'-azobisisobutyronitrile.

Since the polymer chain length is predetermined by the molar ratio of the (meth)acrylic or vinyl or diene monomer or monomers to the radical-generator compound or compounds, this ratio is from 1 to 100,000, advantageously from 50 to 2000. As regards the molar ratio of the metal M to the radical generator(s), it is generally between 0.01 and 100, advantageously between 0.05 and 20 and more particularly less than or equal to 1. The molar ratio L:M, in the case of the formation of compound (I) in situ, may be between 0.01 and 100, preferably between 1 and 5.

The parameter of the polymerization or copolymerization temperature is an extremely important point which distinguishes the process of the invention from the processes currently known using catalytic systems. With the known catalytic processes, the catalyst becomes inactive below a temperature of about 100° C. in the absence of activator. Thus, at 50° C., no polymerization takes place with the $CuCl/2,2$-bipyridine catalyst, and, in the absence of activator, with the catalyst $RuCl_2(PPh_3)_3$, even after reacting for several days. Within the context of the present a invention, it is possible to speak of mild reaction conditions, since it is very uncommon for catalysts in synthesis to remain active at temperatures which may be as low as 0° C. at atmospheric pressure. This advantage is extremely important, all the more so since the stereocontrol of the polymerization or copolymerization reaction is promoted by lowering the temperature. Moreover, bulk reaction conditions (that is to say in the pure monomer or monomers) and solution, emulsion or suspension reaction conditions are generally identical. The temperature and all the molar ratios may be the same irrespective of the reaction process used. The possibility of working, without risk, in the pure monomer obviously constitutes an improvement over standard radical polymerizations. Since the concentration of active centres is constant throughout the polymerization or copolymerization reaction on account of the absence of termination reactions, the large and violent exothermicity (or Trommsdorf effect) of standard radical polymerizations does not occur. For the industrial process, this clearly constitutes important progress since polymerizations or copolymerizations carried out under these conditions no longer risk running totally out of control. In general, the polymerization or copolymerization will be carried out at a temperature of from 0° C. to 130° C., advantageously between 20° and 80° C., without any loss of activity of the catalyst.

Since the initiator systems according to the invention are compatible with water, the polymerization or copolymerization reactions may thus be carried out in aqueous medium, in the presence or absence of emulsifiers. Accordingly, the polymerizations in aqueous medium are carried out either in suspension (water-insoluble radical-generator compound) or in emulsion (water-soluble radical-generator compound) in the presence of emulsifiers. The emulsifiers may be anionic surfactants, such as sodium dodecylbenzenesulphonate, sodium dodecyl sulphate, sodium lauryl sulphate and mixtures thereof, or of the neutral type, such as glycol esters, esters of sorbitan and of polyethylene glycol, such as the monolaurate, monopalmitate, oleate and stearate of sorbitan and of polyethylene glycol, fatty acid esters of polyethylene glycol such as poly-ethylene glycol stearate, and fatty alcohol ethers of poly-ethylene glycol such as the stearyl and cetyl ethers of polyethylene glycol.

When they are carried out in solution, the polymerization or copolymerization reactions of the invention may, obviously, also be carried out in the presence of an organic solvent or a mixture of organic solvents belonging to the following families of solvents:

aromatic hydrocarbons (apolar aprotic): benzene, toluene, ethylbenzenre, xylene;

chlorinated hydrocarbons (polar aprotic): methylene chloride, chlorobenzene;

ethers such as diphenyl ether;

cyclic ethers (polar aprotic): tetrahydrofuran (THF), dioxane;

esters (polar): ethyl acetate, cyclohexyl acetate;

ketones (polar): methyl ethyl ketone, cyclohexanone.

The abovementioned organic solvents are particularly suitable when the monomers to be polymerized or copolymerized are acrylic monomers (methacrylates, acrylates, acrylonitrile) and vinylaromatic monomers such as styrene monomers.

In certain cases, in particular in the polymerization of n-butyl methacrylate and styrene, hexane and cyclohexane may be used, and in the polymerization of vinyl acetate and acrylonitrile, dimethylformamide, dimethyl sulphoxide, acetonitrile or acetone may be used.

It is also possible to envisage a mixture of water and at least one abovementioned solvent, such as a water/THF mixture (cf. Example 1). In such cases, the water is beneficial since it makes it possible to increase the yield of the polymerization reaction.

Thus, in accordance with the present invention, the (co)polymerization of alkyl (meth)acrylates and styrene may be carried out in the presence of the alkyl halide/$RhCl(PPh_3)_3$ initiator system in a water/organic solvent mixture.

In general, the polymerization or copolymerization process according to the invention takes place in an identical manner for the random homopolymerization and copolymerization. For the preparation of block copolymers, including star-shaped block copolymers, the experimental conditions may change during the addition of a monomer which is different from the first after the first monomer has been polymerized. For example, the temperature may be varied in either direction, it being possible for the second dose to be added with a solvent. For the preparation of macromonomers or of $\alpha,\omega$-functionalized polymers (telechelic polymers), the same type of variation in the experimental conditions may be envisaged.

As monomers which may be polymerized and copolymerized in the presence of the polymerization or copolymerization initiator system proposed, mention may be made of (meth)acrylic and vinyl (vinylaromatic, vinyl esters such as vinyl acetate, vinyl chloride and vinyl fluoride) monomers, as well as vinylidene (vinylidene fluoride) monomers.

The initiator system according to the invention is also suitable for the (co)polymerization of optionally fluorinated olefin monomers, such as ethylene, butene, hexene and 1-octene.

For the purposes of the present invention, the term acrylic monomer is understood to refer to a monomer chosen from primary, secondary or tertiary alkyl acrylates in which the alkyl group, which may be substituted, for example, with at least one halogen atom such as fluorine, and/or at least one hydroxyl group, contains 1 to 18 carbon atoms, mention being made more particularly of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate, as well as phenyl acrylate, isobornyl acrylate, alkylthioalkyl or alkoxyalkyl acrylates, acrylonitrile and dialkylacrylamides.

For the purposes of the present invention, the term methacrylic monomer is understood to refer to a monomer chosen from alkyl methacrylates in which the alkyl group, which may be substituted, for example, with at least one halogen atom such as fluorine and/or at least one hydroxyl group, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, β-hydroxyethyl, hydroxypropyl or hydroxybutyl methacrylates, as well as glycidyl methacrylate, norbornyl methacrylate, methacrylo-nitrile and dialkylmethacrylamides.

For the purposes of the present invention, the term vinylaromatic monomer is understood to refer to an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichloro-styrene and 1-vinylnaphthalene.

The term diene monomer is understood to refer to a diene chosen from linear or cyclic, conjugated or non-conjugated dienes such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylidenetetrahydroindene.

According to the invention, it has been observed that, by careful combination of a metal complex as defined above with a polymerization radical-generator compound, random and block homopolymers and copolymers that are fully defined and controlled may be obtained, as well as star-shaped copolymers and α,ω-functionalized (telechelic) macro-monomers and polymers which it has not been possible hitherto to synthesize by standard radical polymerization processes.

The invention thus also relates to the polymers or copolymers as obtained by the abovementioned process, of controlled molecular masses and of narrow polydispersity.

The polymers and copolymers of (meth)acrylic and vinyl monomers as obtained by the process of the invention have molecular masses $\overline{Mn}$ of between 1000 and 500,000 g/mol and a particularly narrow polydispersity $\overline{Mw}/\overline{Mn}$, which is less than 2, even less than 1.5. Furthermore, the process of the invention is extremely regioselective, that is to say that it allows excellent control over the orientation of the monomer units during propagation. Moreover, the chains orient themselves exclusively head-to-tail and no longer head-to-head, as might have been the case in standard radical polymerization. This promotes the thermal stability of the polymers and copolymers thus prepared. The absence of termination reactions removes any other possibility of head-to-head alignment.

By comparison with the known processes of ionic and radical polymerization and copolymerization, the process of the present invention has the following advantages:

homogeneous and live polymerization. As shown in the examples below the polymerization is live according to the criteria generally put forward: linear change in the average masses as a function of the conversion, linear change in $\ln(1/(1\text{-conversion}))$ or in $\ln[M]_0/[M]$ as a function of time, resumption of the polymerization after addition of a fresh dose of monomer (Penczek, S. dans *Makromol. Chem . Rapid. Commun.* 1991, 12, 77)

excellent molecular control: $\overline{Mw}/\overline{Mn}$ narrow to less than 2; good correlation between the theoretical $\overline{Mn}$ and the experimental $\overline{Mn}$; possibility of preparing block copolymers, including star-shaped copolymers;

quantitative polymerization leading to total consumption of the monomer;

mild temperature conditions ranging from 0° C. to 130° C., in particular from 20° to 80° C. and ordinary pressure (slight excess pressure of nitrogen);

the reaction time depends on the concentration of the reaction medium. This is because, the lower the concentration of monomer, the slower will be the polymerization kinetics;

compatibility in aqueous media since the catalysts used do not degrade in the presence of water, the presence of water even being beneficial in the case of water/THF mixtures. Possibility of emulsion and suspension polymerization, in the presence or absence of emulsifiers, the use of soluble phosphines such that, for example, $((Na^{+-}O_3SC_6H_4)_3P)$ makes it possible to dissolve the complex in the aqueous phase;

possibility of stereocontrol, that is to say of controlling the hetero-, syndio- or isotacticity by using chiral catalysts;

excellent control of the synthesis of the polymers or copolymers obtained, the molecular masses of which range between 1000 and 500,000 g/mol (the molecular mass of the polymer obtained is determined by the initial monomer/initiator molar ratio which is up to masses of 500,000 g/mol);

the resistance to thermal degradation of the polymers and copolymers is improved on account of the absence of termination reactions (combinations and disproportionations) which may be shown in particular by thermogravimetric analysis;

production of products that are difficult to access by the usual polymerization techniques, such as pure block copolymers, defined random copolymers and hyperbranched polymers which can be used as adhesives of controlled formulation, shockproof additives, emulsifiers and interface agents;

production of materials with improved properties; the absence of terminal double bonds makes it possible to increase the depolymerization temperature of the polymers, in particular of PMMA;

controlled polymerization which makes it possible to avoid the auto-acceleration of the polymerization (known as the gel effect or Trommsdorf effect). The control of the polymerization by the metal M complex makes it possible to avoid the sudden auto-acceleration of the polymerization after very rapid setting. This phenomenon is generally harmful for the manufacturer and the product. In particular, for PMMA which needs to be in the form of cast plates, it is important for the polymerization to be controlled in order to avoid the appearance of bubbles or defects at the surface of the plate. The gel point may be avoided by using suitable, sometimes long, temperature cycles. A single temperature is preferably used, which is a simplification for the process.

It may also be shown that the rhodium complexes do not require any careful polymerization conditions, such as those employed, for example, with catalysts of Ziegler-Natta type.

Non-limiting examples describing the preparation of polymers as obtained according to the process of the present invention are given below.

The experimental number-average molecular masses ($\overline{Mn}_{exp}$) are obtained by gel permeation chromatography (GPC) calibrated with monodispersed poly(methyl methacrylate) (PMMA) standards, except where otherwise mentioned. The theoretical number-average molecular masses ($\overline{Mn}_{theor}$) are calculated from the monomer/initiator molar ratio, corrected by the yield ($\overline{Mn}_{theor}$=([M]×yield)/([initiator]×100), [M] being the monomer concentration. The factor f is the initiation efficacy factor, i.e. $\overline{Mn}_{theor}/\overline{Mn}_{exp}$. The polydispersity index is $\overline{Mw}/\overline{Mn}$.

EXAMPLE 1

Polymerization of MMA in a water/THF mixture at 60° C.

192 mg (0.2076 millimol) of RhCl(PPh$_3$)$_3$ are introduced into a round-bottomed flask fitted with a magnetic stirrer. The flask is equipped with a three-way tap, making it possible to use the Schlenk method; the flask may thus be placed under nitrogen via a vacuum/nitrogen cycle repeated three times. 2.0 ml of THF and 2.0 ml of deionized water (both degassed beforehand by freezing and thawing carried out under vacuum) are then added to the syringe (flushed with nitrogen). 2.80 g (3.0 ml) of MMA, which is predistilled in order to remove the stabilizers, are then injected in. Next, 1.0 ml of a CCl$_4$ solution at a concentration of 0.1036 mol/liter in THF is added.

The MMA concentration is thus 3.5 mol/liter and the [MMA]/[CCl$_4$] molar ratio is 270.

The flask is then placed in a bath thermostatically adjusted to 60° C., with magnetic stirring, for 24 hours. After this time, the flask is opened, the reaction medium is diluted with THF and the polymer is then precipitated from cold methanol. The polymer is dried under vacuum at 60° C. to constant weight.

| Yield of polymer:: | 100% |
|---|---|
| $\overline{Mn}_{exp}$ = | 29 800 |
| $\overline{Mn}_{theor}$ = | 27 000 |
| f = | 0.91 |
| $\overline{Mw}/\overline{Mn}$= | 1.48 |
| Tacticity = | 62% syndio |
|  | 34% hetero |
|  | 4% iso |

EXAMPLES 2 to 6

The process is performed as in Example 1, with the following conditions:

191.7 mg of RhCl(PPh$_3$)$_3$;

4 ml of THF (Example 2) or of a THF/water mixture whose proportions vary as indicated in Table 1 below (Examples 3 to 5);

3.0 ml of MMA; and 1.0 ml of a solution of CCl$_4$ at a concentration of 0.1 mol/liter in THF, the MMA concentration thus being 3.5 mol/liter and the [MMA]/[CCl$_4$] molar ratio being 280.

The yields, the $\overline{Mn}_{exp}$ (calibration with apolystyrene with correction by a factor of 1.1) and the value f are given in Table 1 below.

TABLE 1

| Example | Solvent (ml) water | Solvent (ml) THF | Yield (%) | $\overline{Mn}_{exp}$ | f |
|---|---|---|---|---|---|
| 2 | — | 4 | 10 | 4 000 | 0.7 |
| 3 | a few drops | 4 | 10 | 3 900 | 0.72 |
| 4 | 0.5 | 3.5 | 38 | 89 600 | 0.12 |
| 5 | 1 | 3 | 55 | 133 600 | 0.11 |
| 6* | 2 | 2 | 100 | 34 200 | 0.82 |

*The tacticity of the polymer obtained in Example 6 is 64% syndio, 34% hetero and 2% iso.

EXAMPLES 7 to 10

The process is performed as in Example 1, except that the [MMA]/[CCl$_4$] molar ratio is modified as indicated in Table 2 below.

The values of the $\overline{Mn}_{theor}$ and $\overline{Mn}_{exp}$, the yield, the $\overline{Mw}/\overline{Mn}$ and f are also given in Table 2 below.

TABLE 2

| Example | [MMA]/[CCl$_4$] | $\overline{Mn}_{theor}$ | $\overline{Mn}_{exp}$ | Yeild (%) | $\overline{Mw}/\overline{Mn}$ | f |
|---|---|---|---|---|---|---|
| 7 | 270 | 27 000 | 29 800 | 100 | 1.48 | 0.91 |
| 8* | 542 | 54 200 | 57 500 | 100 | 1.5 | 0.94 |
| 9 | 992 | 92 400 | 98 200 | 93 | 1.67 | 0.94 |
| 10 | 2157 | 185 700 | 157 500 | 86 | 1.7 | 1.18 |

*The tacticity of the polymer obtained in Example 8 is 59% syndio, 38% hetero, 3% iso.

EXAMPLES 11 to 15

The process is performed as in Example 1, with the following conditions:

153.4 mg of RhCl(PPh$_3$)$_3$;

0.8 ml of a solution of CCl$_4$ at a concentration of 0.1036 mol/liter in THF; and precipitation of the polymers in heptane.

The results obtained are given in Table 3 below.

TABLE 3

| Example | Time (h) | Yield (%) | $\overline{Mn}_{exp}$ | $\overline{Mw}/\overline{Mn}$ | ln[M]$_o$/[M] | f |
|---|---|---|---|---|---|---|
| 11 | 0.5 | 11.3 | 33 800 | 1.79 | 0.12 | 0.75 |
| 12 | 2 | 17.5 | 74 000 | 1.64 | 0.192 | 0.53 |
| 13 | 5 | 32 | 99 600 | 1.77 | 0.386 | 0.73 |
| 14 | 10 | 43 | 131 500 | 1.75 | 0.562 | 0.74 |
| 15 | 24 | 70 | 144 000 | 2 | 1.2 | 1.1 |

An exponential change in the yield over time is observed. The relationship "ln[M]$_o$/[M] vs time" is a linear relationship, providing proof of a live process (good control of the polymerization). Moreover, the $\overline{Mn}_{exp}$ varies almost linearly with the yield, the deviations observed being due to experimental errors.

EXAMPLE 16
Polymerization of styrene

The process is performed as in Example 1, with the following conditions:
- 154.6 mg (0.167 mmol) of RhCl(PPh$_3$)$_3$;
- 2.0 ml (17.38 mmol) of styrene (Acros), dried over CaH$_2$ and distilled onto polystyryllithium; and
- 0.8 ml of a solution of CCl$_4$ at a concentration of 0.1036 mol/liter in THF; and
- reaction time: 120 hours.

Yield: 72%
$\overline{Mn}_{exp}$=41 000
$\overline{Mn}_{theor}$=15 100
f=0.37
$\overline{Mw}/\overline{Mn}$=1.98

EXAMPLE 17
Polymerization of n-butyl methacrylate (n-BuMA)

The process is performed as in Example 1, with the following conditions:
- 5 154.4 mg (0.167 mmol) of RhCl(PPh$_3$)$_3$;
- 3 ml (18.86 mmol) of n-BuMA (Acros), dried over CaH$_2$ and distilled;
- 0.8 ml of a solution of CCl$_4$ at a concentration of 0.1036 mol/liter in THF; and
- reaction time: 48 hours.

Yield: 100%
$\overline{Mn}_{exp}$=25 600 (calibration with polystyrene)
$\overline{Mw}/\overline{Mn}$=1.59

EXAMPLE 18
Repeat of the polymerization of MMA

The process is performed as in Example 1, by carrying out a first step with the following conditions:
- 192.1 mg (0.2076 mmol) of RhCl(PPh$_3$)$_3$;
- 3.0 ml of MMA;
- 1.0 ml of a solution of CCl$_4$ at a concentration of 0.1036 mol/liter in THF; and
- reaction time: 17 hours.

After this first sequence, the yield is 100%, the $\overline{Mn}_{exp}$ is 29,800, $\overline{Mw}/\overline{Mn}$ is 1.48, and f is 0.91.

A further 2.0 ml of THF, 2.0 ml of water and 3.0 ml of MMA are then added. The mixture is then left to react for 25 hours, still at 60° C. The polymer is precipitated from methanol.

After this second sequence, the $\overline{Mn}_{exp\ is}$ 54,100, the yield is 100%, the polydispersity index ($\overline{Mw}/\overline{Mn}$) is 1.7 and f is 1.

EXAMPLES 19 and 20
Random copolymerization of MMA and n-BuMA

The process is performed as in Example 1, except with the following conditions:
- 115 mg (0.124 mmol) of RhCl(PPh$_3$)$_3$;
- 1.5 ml (14.02 mmol) of MMA and 1.5 ml (9.43 mmol) of nBuMA; and
- 0.6 ml of a solution of CCl$_4$ at a concentration of 0.1036 mol/liter in THF.

The results obtained are given in Table 4 below.

TABLE 4

| Example | Time (h) | Yield (%) | $\overline{Mn}_{exp}$* | $\overline{Mw}/\overline{Mn}$ |
|---|---|---|---|---|
| 19 | 1.25 | 34 | 18,500 | 1.88 |
| 20 | 18 | 100 | 54,000 | 1.41 |

*Calibration with polystyrene.

The $\overline{Mn}_{theor}$ at 100% yield is 44,000. The relationship "$\overline{Mn}_{theor}$ Vs yield" is a linear relationship. The Tg of the final copolymer, measured by DSC, is 80° C., and thus obeys the Fox law (Tg$_{Pn\text{-}BuMA}$=8° C. and Tg$_{PMMA}$=120° C.). $^1$H NMR analysis indicates a composition (in moles) of 66% MMA and 34% n-BuMA.

EXAMPLE 21
MMA-b-nBuMA block copolymerization

The process is performed as in Example 1, by carrying out a first step with the following conditions:
- 115 mg (0.1243 mmol) of RhCl(PPh$_3$)$_3$;
- 1 ml of water;
- 1 ml of THF;
- 1.5 ml of MMA;
- 0.6 ml of a solution of CCl$_4$ at a concentration of 0.1036 mol/liter in THF; and
- reaction time: 22 hours.

After this first sequence, the yield is 100%.

A further 2 ml of THF and 1.5 ml of n-BuMA are added and the mixture is left to react for 24 hours, the temperature still being maintained at 60° C. The copolymer obtained is precipitated from cold methanol.

The total yield (after the two sequences) is 90%. As regards the final copolymer:

$\overline{Mn}_{exp}$ 44,000 (calibration with polystyrene)
$\overline{Mn}_{theor}$ 44,000
f 1.0
$\overline{Mw}/\overline{Mn}$=1.98

DSC analysis indicates two Tgs, one at 8° C. (corresponding to the Pn-BuMA block) and the other at 117° C. (corresponding to the PMMA block).

EXAMPLE 22
Polymerization of MMA with formation of the rhodium complex in situ The experimental conditions are identical to those used in Example 1. 0.0292 g of RhCl$_3$.H$_2$O (0.139 mmol) and 0.1465 g, i.e. 4 equivalents, of triphenylphosphine (recrystallized beforehand from ethanol) are introduced into a tube. A series of three vacuum/nitrogen cycles are carried out in order to remove the oxygen. 1.4 ml of double-distilled water and 1.4 ml of THF (these having been degassed by passing a stream of nitrogen) are added using a syringe. The reaction medium is then placed in a bath at 60° C. for a period of 1 hour. 2 ml of MMA and 0.6 ml of a solution (0.1036 mol/l) of CCl$_4$ in THF are then added. The mixture is left to react for 16 h at 60° C. The reaction medium is dissolved in THF and precipitated from THF. A quantitative yield of polymer is obtained. The $\overline{Mw}$, calculated by GPC, is 28,500 (polystyrene calibration); f is 1.05; and $\overline{Mw}/\overline{Mn}$ is 1.45.

EXAMPLES 23 to 27
Polymerization of MMA in a water/THF mixture at 68° C.

The process is performed as in Example 1, with the following conditions:

1 ml of THF
1 ml of water
1.5 ml of MMA
0.5 ml of $CCl_4$ at a concentration of 0.1036 mol/liter in THF;
0.096 g of $RhCl(PPh_3)_3$
temperature: 68° C.
precipitation of the polymers from heptane.

The results obtained are given in Table 5 below, from which the same observations as for Examples 11 to 15 may be made.

TABLE 5

| Example | Time (min) | Yield (%) | $\overline{Mn}_{exp}$ | $\overline{Mw}/\overline{Mn}$ | $\ln[M]_o/[M]$ |
|---|---|---|---|---|---|
| 23 | 30 | 24 | 15,980 | 1.95 | 0.27 |
| 24 | 60 | 33 | 22,150 | 1.91 | 0.40 |
| 25 | 120 | 41 | 26,120 | 1.84 | 0.53 |
| 26 | 250 | 57 | 48,720 | 1.51 | 0.84 |
| 27 | 480 | 86 | 58,100 | 1.58 | 1.97 |

The preceding examples can be repeated with similar success by substituting the generically or specifically described reactants and/or operating conditions of this invention for those used in the preceding examples.

The entire disclosure of all applications, patents and publications, cited above, and of corresponding French application 96/13571, are hereby incorporated by reference.

From the foregoing description, one skilled in the art can easily ascertain the essential characteristics of this invention, and without departing from the spirit and scope thereof, can make various changes and modification of the invention to adapt it to various usages and conditions.

We claim:

1. A process for the controlled radical polymerization or copolymerization of (meth)acrylic and/or vinyl and/or vinylidene and/or diene monomers, characterized in that at least one of the said monomers is polymerized or copolymerized in bulk, solution, emulsion or suspension, at a temperature which may be as low as 0° C., in the presence of an initiator system comprising:

at least one non-peroxy radical-generator compound; and
at least one catalyst consisting essentially of a metal complex represented by formula (I) below:

$$MA_a(L)_n \qquad (I)$$

in which:
M represents Rh, Co or Ir;
A represents a halogen or a pseudohalogen;
the groups L, which may be identical or different, each represent a ligand which may be a chiral ligand, which is chosen from cyclooctadiene, PRR'R", P(OR)(OR')(OR"), NRR'R", ORR', SRR', SeRR', AsRR'R", SbRR'R", each radical R, R' and R" independently representing an optionally substituted $C_1$–$C_{14}$ alkyl group or an optionally substituted aromatic group, it being possible for at least two of these ligands to be joined together by one or more divalent radicals;
a is an integer such that $1 \leq a \leq 3$;
n is an integer such that $1 \leq n \leq 5$, and in the absence of activator.

2. A process according to claim 1, characterized in that the metal M is Rh.

3. A process according to claim 1, characterized in that A represents a halogen chosen from Cl, Br, F and I or a pseudohalogen chosen from CN, NCS, $NO_2$, $NO_3$, $N_3$, $OCOCF_3$, $OCOCH_3$ and $BF_4$.

4. A process according to claim 1, characterized in that the groups L each represent a phosphine PRR'R", R, R' and R" each independently representing a $C_1$–$C_{14}$ alkyl group which may be substituted with $SO_3^-$, COOH, alkoxy, alkyl-S-, or an aromatic group which may be substituted with at least one group chosen in particular from halogen, alkyl, $CF_3$, alkoxy, $NO_2$ or $SO_3^-$, it being possible for at least two of these ligands to be connected to form a polyphosphine which may contain at least one hetero atom, such as N, P, S or O.

5. A process according to claim 1, characterized in that the divalent radical connecting two ligands L is an alkylene radical.

6. A process according to claim 1, characterized in that the complex of formula (I) bears a cationic charge.

7. A process according to claim 1, characterized in that the catalyst is RhCl(PRR'R"), R, R' and R" being as defined in claim 1, on $RhCl(PPh_3)_3$ or $RhBr(PPh_3)_3$.

8. A process according to one of claims 1 to 7, characterized in that the complex of formula (I) is formed in situ in the reaction medium from a metal salt of formula $MA_b$ or $MA_b.xH_2O$, M and A being as defined in claim 1, b being 2 or 3 and x being between 1 and 10, and ligands L as defined in claim 1.

9. A process according to claim 8, characterized in that the anhydrous metal salts $MA_b$ are chosen from $RhCl_3$, $RhI_3$, $CoCl_2$, $CoF_2$ and $CoF_3$, and the hydrated metal salts $MA_b.xH_2O$ are chosen from $RhBr_3.2H_2O$, $RhCl_3.xH_2O$ (x being between 1 and 10) and $CoCl_2.6H_2O$.

10. A process according to claim 1, characterized in that the free-radical-generator compound is monofunctional and chosen from the following classes of compounds:

(a) derivatives of formula:

where:
Y=Cl, Br, I, F, H or $-CR^1R^2OH$, $R^1$ and $R^2$ each independently representing hydrogen or $C_1$–$C_{14}$ alkyl; and
Z=Cl or Br, (b) derivatives of formula:

where $R^3$ represents a phenyl group; benzyl group; benzoyl group; alkoxycarbonyl group; group $R^4CO$ with $R^4$ representing $C_1$–$C_{14}$ alkyl or aryl; alkyl group; mesityl group; trifluoromethyl group; or nitro, (c) derivatives of formula:

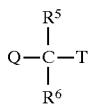

in which:
Q represents a chlorine or bromine atom or an acetate or trifluoroacetate or triflate group;
$R^5$ represents a hydrogen atom, a $C_1$–$C_{14}$ alkyl group or an aromatic —$CH_2OH$ group; or a —$CH_2OH$ group;

T represents a group

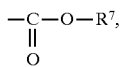

with $R^7$ representing hydrogen or an alkyl or aromatic group; a CN group; a group

with $R^8$ representing $C_1$–$C_{14}$ alkyl, phenyl or isocyanate; a hydroxyl group; a nitro group; a substituted or unsubstituted amino group; a $C_1$–$C_{14}$ alkoxy group; a group $R^9CO$, with $R^9$ representing $C_1$–$C_{14}$ alkyl or aryl;

$R^6$ represents a group falling within the definitions of $R^5$ or of Q or a functional group such as hydroxyl, nitro, substituted or unsubstituted amino, $C_1$–$C_{14}$ alkoxy, acyl, carboxylic acid or ester;

(d) α-halo lactone or lactam compounds;

(e) N-halosuccinimides, and N-halophthalimides;

(f) alkylsulphonyl halides and arylenesulphonyl halides;

(g) compounds of formula:

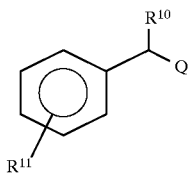

where:
$R^{10}$ represents a hydrogen atom, a $C_1$–$C_{14}$ alkyl. group or a carboxylic acid, ester, nitrile or ketone group;
$R^{11}$ represents a hydrogen atom or a $C_1$–$C_{14}$ alkyl, hydroxyl, acyl, substituted or unsubstituted amine, nitro, $C_1$–$C_{14}$ alkoxy or sulphonate group; and
Q has the meaning given above;

(h) compounds of formula:

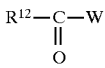

where:
$R^{12}$ represents $C_1$–$C_{14}$ alkyl or aryl;
W represents halogen or pseudohalogen;

(i) compounds of formula:

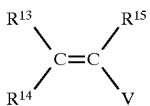

where:
$R^{13}$, $R^{14}$ and $R^{15}$ each independently represent $C_1$–$C_{14}$ alkyl or aryl; and V represents halogen, acetate, trifluoroacetate or triflate;

(j) aromatic halides of formula:

Ar - U where:
Ar represents an aromatic group such as $C_6H_5$-which may be substituted in the ortho, meta or para position with an electron-withdrawing or electron-donating group; and
U represents a halogen.

11. A process according to claim 1, characterized in that the radical-generator compound is multifunctional and comprises of at least two monofunctional radical-generator groups derived from classes(c) to (j), connected by a chain of methylene units or by a benzene ring, or is chosen from acetic anhydrides such as chloroacetic anhydride and chlorodifluoroacetic anhydride, and tri- or tetrahalomethanes and trichloromethyl derivatives of classes (a) and (b).

12. A process according to claim 10, characterized in that the radical-generator compound is an alkyl halide or an alkylsulphonyl or arylenesulphonyl halide.

13. A process according to claim 1, characterized in that the molar ratio of the monomer or monomers to the radical-generator compound or compounds is from 1 to 100,000.

14. A process according to claim 1, characterized in that the molar ratio of the metal M to the radical generator(s) is from 0.01 to 100.

15. A process according to claim 8, characterized in that the molar ratio L:M is between 0.01 and 100, preferably between 1 and 5.

16. A process according to claim 1, characterized in that the polymerization or copolymerization is carried out at a temperature of from 0° C. to 130° C.

17. A process according to claim 1, characterized in that the polymerizable or copolymerizable monomers comprise at least one monomer chosen from methacrylates, acrylates, vinylaromatic derivatives, vinyl acetate, vinyl chloride, vinyl fluoride and vinylidene fluoride.

18. A process according to claim 17, characterized in that the monomer is methyl methacrylate, ethyl methacrylate, n-butyl methacrylate, n-butyl acrylate, acrylonitrile on styrene.

19. A process according to claim 1, characterized in that a block copolymerization is carried out by introducing, into the polymerization medium into which the first monomer has been polymerized, a second monomer, optionally with a further addition of initiator system.

20. A process according to claim 1, characterized in that the (co)polymerization is carried out in aqueous medium, in the presence or absence of emulsifiers; in the presence of an organic solvent or a mixture of organic solvents, such as aromatic hydrocarbons, chlorinated hydrocarbons, cyclic ethers, esters and ketones; or in a mixture of water and at least one of said solvents.

21. A process according to claim 1, characterized in that the (co)polymerization of alkyl (meth)acrylates and styrene is carried out in the presence of the alkyl halide/$RhCl(PPh_3)_3$ initiator system in a water/organic solvent mixture.

* * * * *